(No Model.)
H. H. SPORTON & E. WHITE.
APPARATUS FOR RECORDING AUTOMATICALLY THE FLOW OF WATER, &c.
No. 410,214. Patented Sept. 3, 1889.
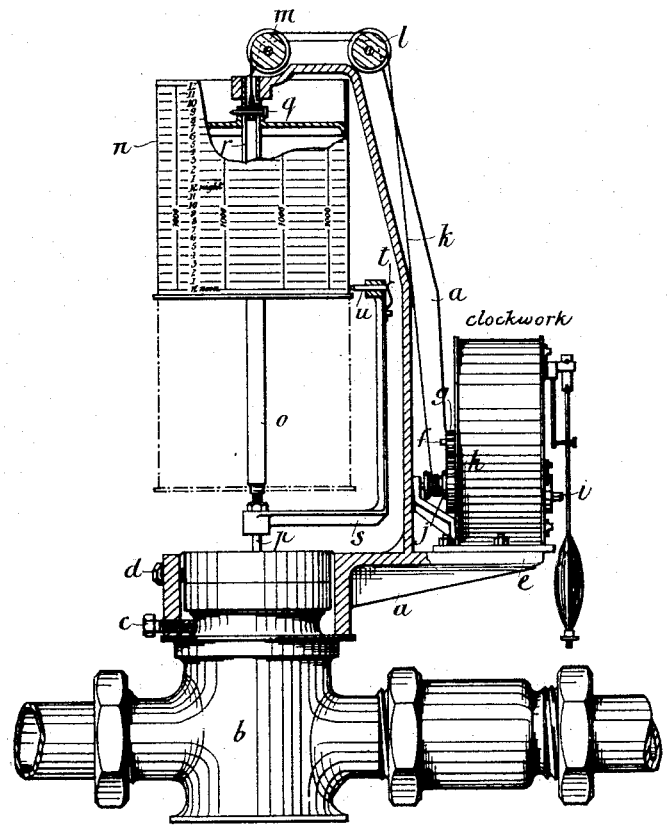
Witnesses:
Inventors:

United States Patent Office.

HENRY HERBERT SPORTON AND ERNEST WHITE, OF ENFIELD, COUNTY OF MIDDLESEX, ENGLAND.

APPARATUS FOR RECORDING AUTOMATICALLY THE FLOW OF WATER, &c.

SPECIFICATION forming part of Letters Patent No. 410,214, dated September 3, 1889.

Application filed April 2, 1889. Serial No. 305,676. (No model.)

*To all whom it may concern:*

Be it known that we, HENRY HERBERT SPORTON and ERNEST WHITE, subjects of the Queen of Great Britain, residing at Enfield, in the county of Middlesex, England, have invented a new and useful Improved Apparatus for Automatically Recording the Flow of Water or other Fluids, of which the following is a specification.

This invention relates to improvements in recording apparatus for use in connection with rotary and other water-meters.

We have shown in the accompanying drawing our elevation of an ordinary rotary meter with an automatic recording apparatus or appliance attached and constructed in accordance with our invention; but we wish it to be clearly understood that our apparatus is applicable to any similar meter, either inverted or placed in any other position.

$a$ is a metal frame adapted to be attached to the body of an ordinary rotary meter—such as that shown at $b$ in the drawing—or to any other meter, and having suitable adjusting-screws $c$ $d$ for securing the said frame firmly to the meter. The frame rises vertically to a suitable height above the meter and then runs horizontally, so as to come directly over the center of the index of the meter.

$e$ is a table or projection on the frame $a$, upon which table an ordinary clock is fixed, and $f$ is the hour-hand spindle of the clock projecting from the case thereof and carrying a pinion $g$. This pinion $g$ engages with a spur-wheel $h$, mounted on a shaft $i$ and having attached to it a barrel $j$, on which is wound a wire or cord $k$, the said cord extending from the barrel over the two pulleys $l$ $m$, connected to the horizontal top part of the frame, as shown.

$n$ is a drum adapted to carry a diagram-paper in the usual manner and attached to the cord $k$, so as to hang directly over the center of the index in the meter, this cord sustaining the weight of the drum.

$o$ is a guide-tube upon which the drum $n$ slides. The said tube at its upper end is secured to the horizontal portion of the frame $a$ and at its lower end is formed with a center and rests upon the arbor $p$ of the meter-index. The cord $k$ is connected to the center of the drum by means of a pin $q$, and the said pin passes through a slot $r$ in the guide-tube $o$, so that no rotation of the drum can take place. The drum is graduated according to the meter to which it is applied. As shown in the drawing, it is divided by circumferential lines into twenty-four parts, corresponding to the hours of a day, and by longitudinal lines into ten parts, the distance between which lines corresponds to that which the index-finger moves to register one thousand gallons. The barrel $j$, on which the wire or cord $k$ is wound, is so arranged that it can be thrown out of gear from the clock, so that the said wire or cord can be unwound from or wound upon the said barrel to adjust the drum to any required position. The spindle $p$, which carries the index-pointer of the meter, has attached to it a pencil-carrier $s$, having a spring $t$ to keep the pencil $u$ in contact with the paper, which is placed round the drum $n$. This pencil-carrier is adapted to move with the spindle of the meter so as to cause the pencil to mark the paper.

The action of our improved apparatus is as follows, that is to say: The clock having been wound up, the drum $n$, with a diagram-paper thereon, is raised by winding the cord $k$ on the barrel $j$ to its highest point, and the pencil-carrier $s$ is attached to the index-spindle and the pencil therein caused to bear lightly upon the paper, so that as the fluid passes through the meter the pencil-holder with its pencil will be caused to revolve round the drum $n$ and make a line thereon. The fluid passing through the meter at the rate of one thousand gallons per hour will cause the pencil to trace a line on the diagram-paper from one vertical line to the next vertical line, and the clock being in motion at the same time the wire or cord $k$ will be unwound from the barrel $j$, causing the drum $n$ to descend to the horizontal line forming the first division, thus indicating that one thousand gallons of fluid have passed in one hour. If the quantity of fluid passing through the meter in the next hour equal ten thousand gallons, the pencil will have traced a fine line right round the diagram-paper, or over ten divisions, and at the same time the clock will have lowered the drum down to the next horizontal line forming the second division or second hour. The flow of fluid through an ordinary meter varies indefinitely, but the variations can be accurately recorded during any space of time by the use of our automatic apparatus in combination with any fluid-meter which has an ordinary index or dial counter, so that the quantities of fluid passing through the meter at any given time, day or night, are accurately recorded.

It will be obvious that our invention may be modified in its details. For example, the diagram-drum can be attached to any of the index-spindles within an ordinary meter, as described in the attachment of the pencil-carrier to the index-spindle, and the pencil can be attached to the clock, so that it will act in the same manner as when the drum is lowered by the clock; also a flat circular diagram-disk can be used for carrying a circular diagram, and this circular disk and diagram can be attached to the index-spindle and the clock made to work the pencil across the diagram-paper.

A great advantage of our invention is that the diagram-carrier is suspended so that its weight assists in operating the clock, whereas in recording apparatus as heretofore constructed the diagram-carrier is positively driven by the clock.

We claim—

1. Apparatus for recording the flow of liquid through fluid-meters, comprising a non-revolving drum or cylinder adapted for carrying a diagram-paper surrounding the same and to be moved lengthwise on an axial support, a clock mechanism for actuating said drum, and an arm carrying a pencil attached to one of the index-spindles of the meter, whereby when the meter is operated the pencil will be caused to travel around the cylinder and over the paper, substantially as shown and described.

2. The combination of the frame $a$, a clock having a barrel carrying a cord, a drum $n$, suspended from the said cord, and a pencil-carrier $s$, adapted to be secured to one of the index-spindles of a fluid-meter and to be moved around the said drum, all substantially as and for the purposes described.

3. In recording apparatus for fluid-meters, the combination of a gravitating diagram-carrier, a clock-work, and a cord connecting the carrier to the clock-work, substantially as set forth, the weight of the carrier serving to assist in operating the clock-work, and the latter serving to control the movements of said carrier, all as and for the purpose described.

HENRY HERBERT SPORTON.
ERNEST WHITE.

Witnesses:
G. F. REDFERN,
A. ALBUTT.